3,026,176
HALIDE RECOVERY FROM SPENT SUPPORTED HALIDE CATALYST

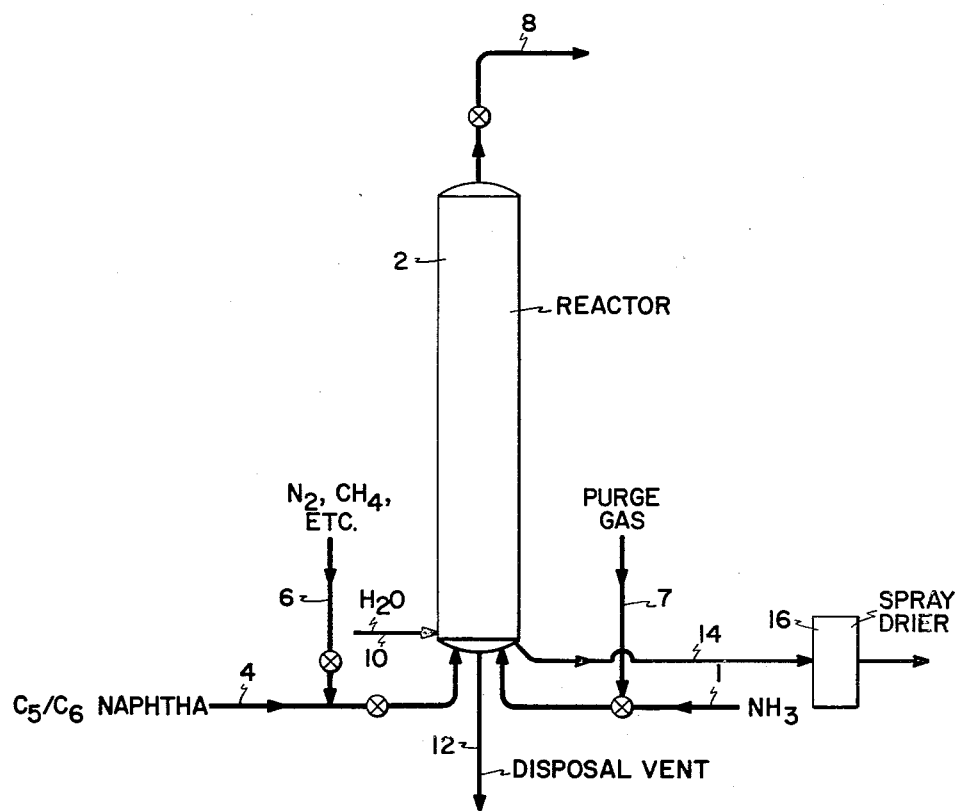

Charles W. Tyson, Summit, N.J., and Richard Joseph De Feo and William Floyd Arey, Jr., Baton Rouge, La., assignors to Esso Research and Engineering Company, a corporation of Delaware
Filed Oct. 29, 1959, Ser. No. 849,567
8 Claims. (Cl. 23—100)

The present invention relates to the use of Friedel-Crafts type catalysts, such as anhydrous aluminum chloride and bromide, for isomerizing, polymerizing, alkylating, and otherwise beneficiating hydrocarbons. More particularly, the present invention relates to the disposal and recovery of supported Friedel-Crafts catalyst spent in the reaction.

In well-known processes such as paraffin isomerization in which aluminum halide catalysts such as aluminum bromide or aluminum chloride are used in conjunction with a support such as bauxite, alumina, molybdenum oxide, clays, and the like, the catalyst gradually becomes deactivated with use. During the isomerization the catalyst probabaly forms hydrocarbon complexes until it is no longer effective for the intended purpose, and must be replaced.

Depending upon the ecnomics, it may be desirable to recover the catalyst or, under other circumstances, to dispose of it. In either case, substantial difficulties are encountered. The fouled catalyst is extremely corrosive, and such disposal means as dumping would involve exposure to air and moisture, with resultant liberation of toxic hydrogen halide and air contamination. Disposal by dumping in water further creates a pollution problem.

It is one of the objects of the present invention to provide a method of removing fouled and spent supported Friedel-Crafts type catalyst from a reaction zone in a safe and effective manner.

It is a still further object of the present invention to indicate methods for recovering the Friedel-Crafts type catalysts which have become deactivated during use in connection with hydrocarbon conversion reactions.

Other objects of the present invention will become more apparent from the following description.

In accordance with the present invention, it has been found that the spent fouled catalyst may be converted to a substantially neutral product by charging the reactor vessel containing the catalyst with gaseous anhydrous ammonia. The latter has been found to form a neutral, difficultly hydrolyzable complex with the catalyst, thus making it safe for disposal by having it in a form that does not readily produce hydrogen halide gas on contact with the moisture in the air.

The spent catalyst in this case does not contain $AlBr_3$ in its original form as is evidenced by the lack of paraffin conversion. This $AlBr_3$ is probably tied up as a hydrocarbon complex, and in this way is deactivated. It may, however, have entered the crystal lattice of the support, or have undergone some other change. The $AlBr_3$, in whatever form it exists, cannot be removed by simple hydrocarbon washing, whereas pure $AlBr_3$ is quite soluble in hydrocarbons. The anhydrous ammonia, therefore, reacts with this mixture of $AlBr_3$ and hydrocarbon, forming a neutral complex.

In accordance with another embodiment of the present invention, the ammonia-treated spent catalyst may be effectively recovered and converted to the active species.

Referring now to the drawing, the invention will be more fully explained as applied to the isomerization of a light virgin $C_5/C_6$ naphtha to form high octane motor fuel. To carry out this reaction, reactor 2 has been packed with a support, preferably alumina or a calcined bauxite "Porocel," and a stream of $C_5/C_6$ naphtha in which 0.1 to 10% $AlBr_3$ has been dissolved has been passed over the bed at a temperature of about 80° to 300° F. HBr had been used as a reaction activator, and $AlBr_3$ was deposited upon the support until 10 to 75% by weight thereof comprised $AlBr_3$, and a substantial equilibrium had been attained. Gradually reaction yields, which had been up to 92% of feed, decreased, due to the catalyst deactivation referred to above.

In accordance with the present invention, the flow of feed hydrocarbons through line 4 is now interrupted, and preferably a purge gas, such as a light hydrocarbon, $N_2$, methane and the like, is passed through lines 6 and 4 to remove traces of feed and any moisture. Purge gases may be removed through line 8, and, if desired, purging may be followed by evacuation. Thereupon, gaseous ammonia is passed into vessel 2 through line 1 and the pressure is allowed to reach at least atmospheric and up to 1000 p.s.i.g.

The reactor is now allowed to stand under ammonia pressure for at least two hours, and up to 10 days to assure complete reaction of the ammonia and $AlBr_3$-hydrocarbon complex. The reaction may be followed with the temperature of the reactor, as the heat of reaction will diminish as the reaction goes to completion. The pressure is released, and the reactor and lines 1 and 8 are purged through line 7 with $N_2$, methane, etc. This eliminates the noxious vapors of excess ammonia upon dumping the neutralized catalyst. Suitable containers are now placed under the reactor, and the neutralized catalyst is released through the disposal vent to the containers. This neutral material may now be safely dumped, or treated as below to recover the active acidic component.

The recovery of the catalyst may be carried out in several ways. The solid neutral complex of the ammonia and $AlBr_3$-hydrocarbon mixture supported on Porocel may be slurry washed with water. The complex breaks down, the $AlBr_3$ is hydrolyzed to give free HBr which immediately combines with the ammonia present to give a neutral solution of $NH_4Br$. The solution may be evaporated or spray dried to give the solid halogen values which may be stored until required, and may be converted into HBr by treatment with an inorganic acid, such as $H_2SO_4$. The HBr may be used to react with Al metal and form $AlBr_3$ for reuse in the catalyst system.

An alternate procedure involves treatment of the $NH_4Br$ solution with elemental $Cl_2$, which liberates free elemental $Br_2$ from the solution. This $Br_2$ may then be used to form $AlBr_3$.

A third method involves the heating of the $AlBr_3$-hydrocarbon-ammonia complex to break it down. Free ammonia is liberated, which may then be reused to deactivate another reactor. The $AlBr_3$ may then be distilled and recovered.

In one of the modifications of the invention wherein the catalyst is to be recovered, water may be admitted through line 10 into reactor 2 and allowed to circulate either upflow or downflow over the $NH_3$-treated catalyst bed while the ammonia pressure on the system is maintained constant. Since the neutralization step is exothermic, a cooler (not shown) is inserted in the water recycle stream to control the temperature to any predesired maximum temperature, i.e. 100° to 250° F. For the same reason the initial addition of ammonia is at a low pressure of about 5 pounds absolute or below; pressure is raised after the water circulation is established for temperature control.

The halide content of the bed is leached out as the soluble neutral ammonia additive product. Similarly, any residual HBr is converted into ammonium bromide. The presence of gaseous ammonia insures that all parts of the system are maintained in an alkaline condition so that corrosion of steel and other parts is eliminated.

When solution of the halogen-containing compound is complete, a concentrated aqueous solution is withdrawn through line 14 and passes spray dried 16 to recover the solid halogen values which may be stored until required and may be converted into HBr by treatment with an inorganic acid, such as $H_2SO_4$, in a manner known per se. The reactor vessel is now purged with steam, passed through line 6 and finally swept clean of vapors by air. The catalyst support may now be removed from vessel 2 via line 12 for discard or for revivification without the hazards mentioned heretofore.

The spray dried ammonium halide complex may be used as a source of hydrogen halide to react with aluminum metal and form the aluminum halide again with evolution of hydrogen. This may be done in a solution of oil and the product after removing the hydrogen sent to the reactor to saturate a fresh charge of catalyst support. The regeneration of the hydrogen halide may be accomplished by using an acid such as sulfuric acid to free the hydrogen halide from the ammonium halide. This, of course, could be done either with a solution before spray drying or by the solid ammonium halide after spray drying.

The ammonium sulfate resulting from the reaction of the paragraph above may be either sold as a chemical or the ammonia may be regenerated by reaction with sodium hydroxide, calcium hydroxide, or other alkali.

*Example 1*

A typically deactivated catalyst from a light naphtha isomerization pilot plant was treated as follows. The catalyst consisted of $AlBr_3$ supported on $Al_2O_3$. The reactor was flushed for 30 minutes with $N_2$. After $N_2$ flush, all pressure was released from the reactor and the vessel was blocked off as a single unit. The water jacket was drained, and all sources of heat exchange were removed. Ammonia was injected and held in the reactor at 5 lb. pressure. Temperatures were obtained in 15 minute intervals until chemical reaction subsided. Initial temperature was 80° F., and the maximum was 342° F. The reactor was left closed over night.

The ammonia used in the treat is shown below:

|  | G. |
|---|---|
| Charge wt. of $Al_2O_3$ | 658.0 |
| Gain from $AlBr_3$ adsorbed on $Al_2O_3$ | 196.5 |
| Gain from $NH_3$ treat | 140.5 |
| Total discharge wt. | 995.0 |

After the $NH_3$ treatment, the catalyst support did not evolve HBr on exposure to air; and it flowed freely, allowing safe disposal.

What is claimed is:

1. A process for removing spent supported catalyst from a Friedel-Crafts reaction zone, said catalyst selected from the group consisting of aluminum bromide and aluminum chloride, which comprises interrupting the flow of hydrocarbon feed into said zone, passing anhydrous ammonia into said zone, maintaining said ammonia in said zone for at least 2 hours, forming a substantially neutral solid product in said zone with said spent catalyst, and withdrawing said product from said zone.

2. A process for removing a spent aluminum bromide supported catalyst from a Friedel-Crafts reaction zone, which comprises halting flow of hydrocarbon feed to said zone, passing gaseous ammonia into said zone, maintaining an ammonia pressure of from about atmospheric to about 1000 p.s.i.g. in said zone, maintaining said ammonia in said zone for at least two hours, and withdrawing a neutral solid reaction product from said zone.

3. The process of claim 2 wherein said zone is purged with an inert gas prior to introduction of said ammonia.

4. The process of claim 2 wherein said solid reaction product is further treated to recover bromine-containing components.

5. The process of claim 2 wherein said support is a calcined bauxite.

6. The process of claim 2 wherein said support is alumina.

7. A process for recovering a spent aluminum bromide supported catalyst from a Friedel-Crafts reaction zone which comprises halting the flow of hydrocarbon feed to said zone, passing gaseous ammonia into said zone, maintaining said ammonia in said zone for at least 2 hours, passing water to said zone and withdrawing an aqueous solution of ammonium bromide from said reaction zone.

8. In the process of removing spent supported catalyst from a Friedel-Crafts reaction zone, said catalyst selected from the group consisting of aluminum bromide and aluminum chloride, wherein exposure of the catalyst to air and moisture normally results in the liberation of toxic hydrogen halide gas, the improvement which comprises contacting the spent catalyst with gaseous anhydrous ammonia for at least two hours, forming a substantially neutral solid product in said zone of aluminum catalyst and ammonia and withdrawing from said reaction zone the solid product which does not form hydrogen halide gas on contact with air.

References Cited in the file of this patent

UNITED STATES PATENTS

| 2,254,618 | McMillan et al. | Sept. 2, 1941 |
| 2,287,535 | Powers | June 23, 1942 |
| 2,483,487 | Carney | Oct. 4, 1949 |
| 2,485,050 | Hepp et al. | Oct. 18, 1949 |
| 2,525,830 | Sailors et al. | Oct. 17, 1950 |
| 2,752,289 | Haensel | June 26, 1956 |

OTHER REFERENCES

Mellor: "Comprehensive Treatise on Inorganic and Theoretical Chemistry," vol. 2, page 590 (1922); vol. 5, page 326 (1924), Longmans, Green & Co., New York, N.Y.